Patented May 30, 1933

1,911,316

UNITED STATES PATENT OFFICE

HERMANN HAUSER AND MAX BOMMER, OF BASEL, SWITZERLAND, ASSIGNORS TO THE FIRM SOCIETY OF CHEMICAL INDUSTRY IN BASLE, OF BASEL, SWITZERLAND

HYDROXYETHYLAMINO-DERIVATIVES OF THE ANTHRAQUINONE SERIES AND PROCESS OF MAKING SAME

No Drawing. Application filed May 26, 1931, Serial No. 540,208, and in Switzerland June 4, 1930.

The present invention relates to the manufacture of hydroxyethylamino-derivatives of the anthraquinone series. It comprises the process of making these derivatives and the derivatives themselves.

It is known that hydroxyethylamino-derivatives of the anthraquinone series may be made by condensing the corresponding leuco-hydroxy-compounds with mono-ethanolamine and subsequently oxidizing the condensation product thus formed (compare, for example, British Specification No. 289,807, Examples 3 and 4). The subsequent oxidation is best performed by means of an oxidizing agent, such as nitrobenzene or benzoyl peroxide in some cases with the addition of a catalyst (compare German Specification No. 488,684 and British Specification No. 270,779).

According to this invention the leuco-compounds which are obtained by condensing leuco-1:4-dihydroxyanthraquinones with mono-ethanolamine, that is to say the products of the general formula

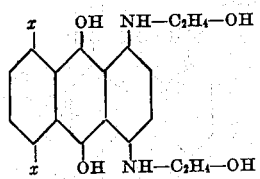

wherein $x$ in both cases stands for H or OH, have the pecularity that when heated with an excess of concentrated mono-ethanolamine, or further products of the reaction of ethylene-oxide with ammonia (di- or triethanolamine or mixtures of mono-, di- and triethanolamine), with access of air, they are oxidized smoothly to anthraquinone derivatives. The isolated leuco-compounds may be treated in this manner or the condensation of the leuco-hydroxyanthraquinone with the concentrated mono-ethanolamine and the formation of the dyestuff may occur in a single operation which is of great practical advantage.

In contrast with the processes hitherto known, the new process has the advantage that it uses neither costly materials for the oxidation nor solvents which must be regenerated; the products obtained are distinguished to a surprising extent from those which are made by oxidation according to the aforesaid specifications by the extraordinary purity of the dyeing tints which they yield.

The following examples illustrate the invention, the parts being by weight:—

Example 1

10 parts of the leuco-derivative obtained by reaction of leuco-1:4:5:8-tetrahydroxy-anthraquinone of the formula

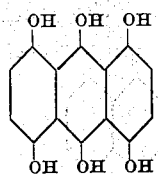

with an alcoholic solution of monoethanolamine are heated with access of air in 50 parts of pure monoethanolamine for 3 hours at 50-60° C. The violet brown color changes very rapidly into a blue-green. The dyestuff of the formula

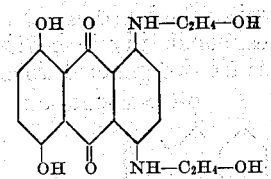

is precipitated by addition of alcohol and is filtered and dried. When made into a paste in the usual manner it dyes acetate silk bluish green tints which are considerably more pure and more greenish than those obtained by means of the products made by oxidizing the leuco-compound with nitrobenzene.

A similar procedure may be followed with other condensation products; for example when the condensation product from leuco-1:4-dihydroxyanthraquinone and monoethanolamine is treated with ethanolamine a product of the formula

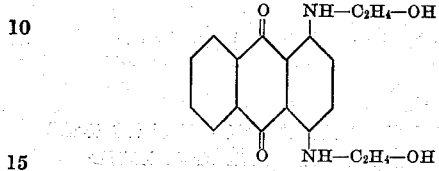

is obtained which dyes acetate silk extraordinarily pure blue tints.

*Example 2*

10 parts of leuco-1:4:5:8-tetrahydroxyanthraquinone are heated with 50 parts of monoethanolamine with access of air at 50–60° C. for 3 hours. The mixture is worked up as described in Example 1 and the pure product of the formula

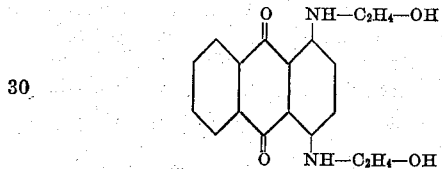

is thus obtained from the leuco-derivative in one operation.

What we claim is:—

1. Process for the manufacture of hydroxyethylamino-derivatives of the anthraquinone series, consisting in heating the leuco-derivatives of the general formula

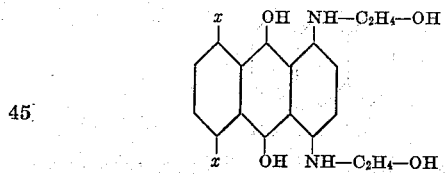

wherein $x$ in both cases stands for H or OH, with access of oxygen in presence of concentrated products of the reaction of ethylene-oxide with ammonia.

2. Process for the manufacture of hydroxyethylamino-derivatives of the anthraquinone series, consisting in heating the leuco-derivatives of the general formula

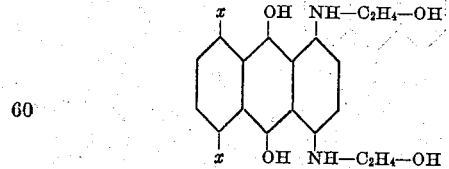

wherein $x$ in both cases stands for H or OH, with access of oxygen in presence of concentrated monoethanolamine.

3. Process for the manufacture of a hydroxyethylamino-derivative of the anthraquinone series, consisting in heating the leuco-derivative of the formula

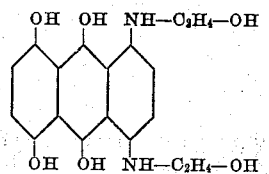

with access of oxygen in presence of concentrated monoethanolamine.

4. A modification of the process of claim 1, consisting in heating leuco-derivatives of the general formula

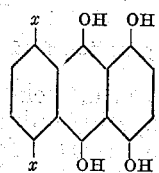

wherein $x$ in both cases stands for H or OH, with access of oxygen in presence of concentrated products of the reaction of ethylene-oxide with ammonia.

5. A modification of the process of claim 2, consisting in heating leuco-derivatives of the general formula

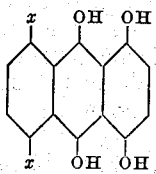

wherein $x$ in both cases stands for H or OH, with access of oxygen in presence of concentrated monoethanolamine.

6. A modification of the process of claim 3, consisting in heating a leuco-derivative of the formula

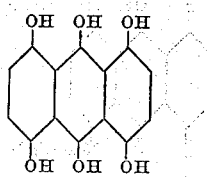

with access of oxygen in presence of concentrated monoethanolamine.

7. The hydroxyethylamino-derivatives of the anthraquinone series of the general formula

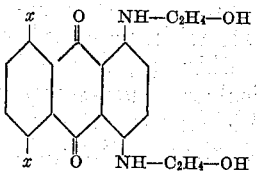

wherein $x$ in both cases stands for H or OH, obtained by heating the leuco-derivatives of the general formula

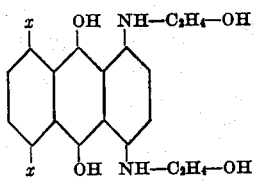

wherein $x$ in both cases stands for H or OH, with access of oxygen in presence of concentrated products of the reaction of ethylene-oxide with ammonia, which products dye acetate silk blue green to green blue tints of a purity not hitherto reached.

8. The hydroxyethylamino-derivatives of the anthraquinone series of the general formula

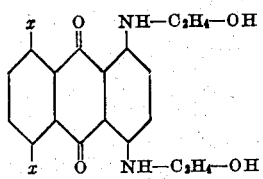

wherein $x$ in both cases stands for H or OH, obtained by heating the leuco-derivatives of the general formula

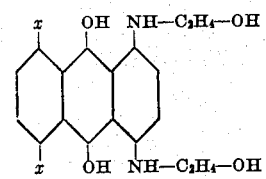

wherein $x$ in both cases stands for H or OH, with access of oxygen in presence of concentrated monethanolamine, which products dye acetate silk blue green to green blue tints of a purity not hitherto reached.

9. The hydroxyethylamino-derivative of the anthraquinone series of the formula

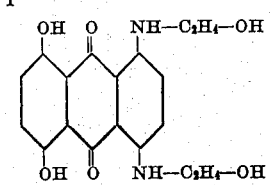

obtained by heating the leuco-derivative of the formula

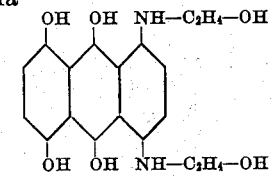

with access of oxygen in presence of concentrated monoethanolamine, which product dyes acetate silk a bluish green tint of a purity not hitherto reached.

In witness whereof we have hereunto signed our names this 13th day of May, 1931.

HERMANN HAUSER.
MAX BOMMER.